Dec. 6, 1938.    H. TONJES, JR    2,139,212
GUIDED PLOW HITCH
Filed May 12, 1938    2 Sheets-Sheet 1

Inventor
Henry Tonjes Jr.
By Arthur H. Sturges
Attorney

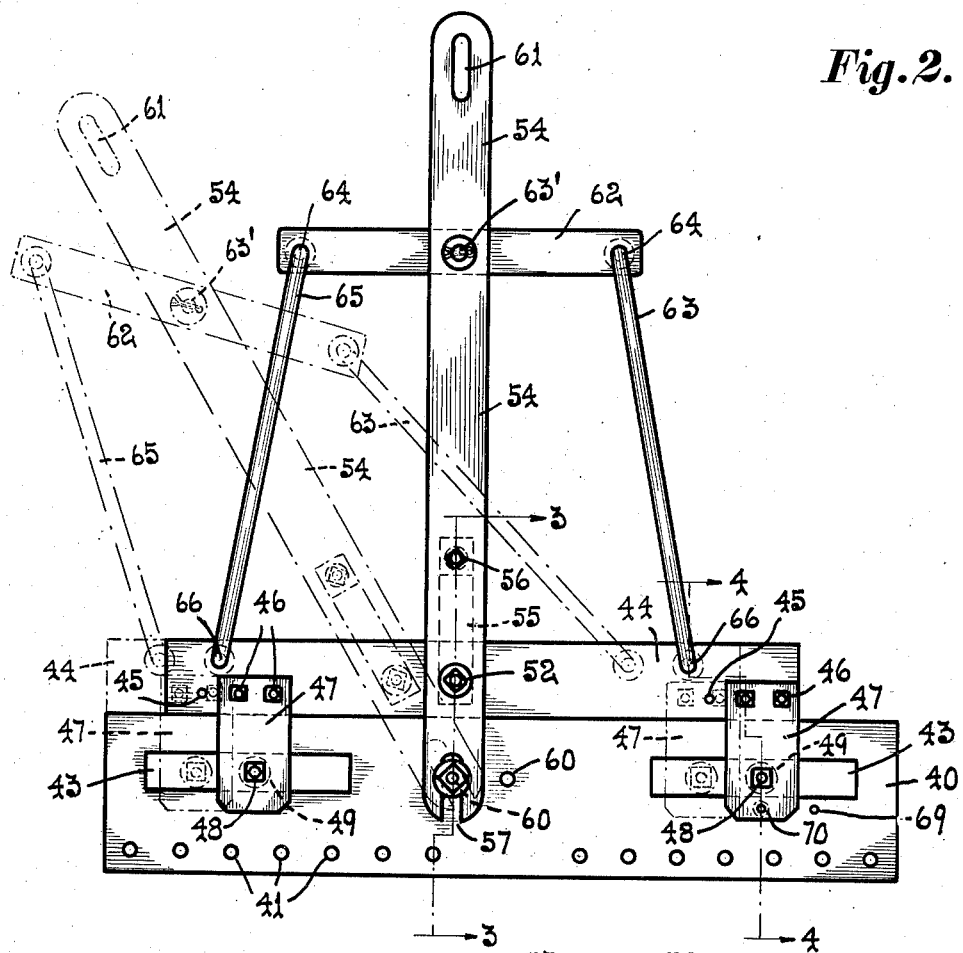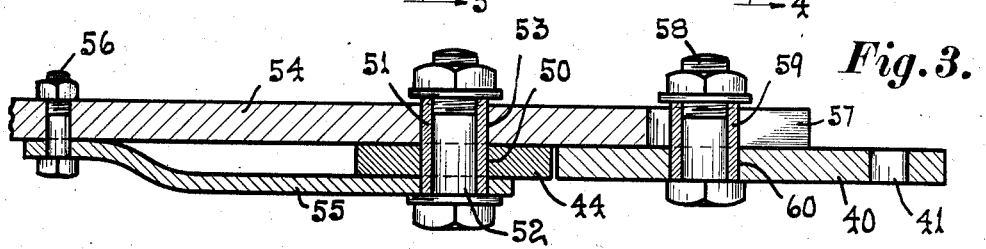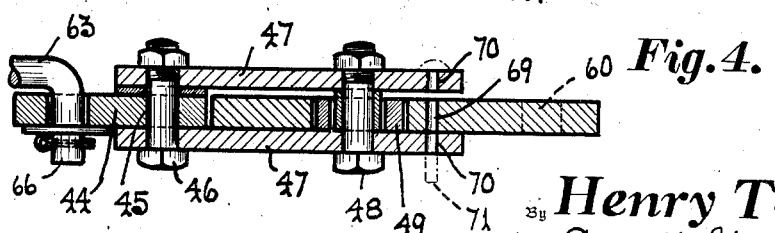

Patented Dec. 6, 1938

2,139,212

UNITED STATES PATENT OFFICE 2,139,212

GUIDED PLOW HITCH

Henry Tonjes, Jr., Wisner, Nebr.

Application May 12, 1938, Serial No. 207,521

2 Claims. (Cl. 280—33.10)

This invention relates to agricultural machinery and more particularly to hitches for coupling tractors to plows having one or a gang of plow-shares supported by a pair of wheels.

It is an object of the invention to provide towing hitch means for preventing the mould boards of such plows from having turning movements transversely of the line of travel while forming a furrow or furrows and particularly at times when heavy or hard soil, such as gumbo or clay, is being worked whereby an abnormal amount of tractive effort is not required and tractor fuel is conserved.

A further object of the invention is to provide means for preventing furrows from being formed of a width greater than is necessary and a greater plantable area of fields may be utilized than heretofore.

Another object of the invention is to provide a towing hitch plow combination which causes the plow to remain in the soil during the formation of furrows, particularly furrows at the angular corners of a rectangular field and which will also cause the plow shares to be extended outwardly further into said corners than heretofore to provide furrows which are more rectangular in plan at the corners of a rectangular field than heretofore, whereby fields may be more intensely cultivated and said corners more fully utilized for planting crops than heretofore.

A further object of the invention is to provide a towing hitch which causes all portions of the soil engaging parts of the plow thereof to move backwards in furrows at times when the towing tractor is backed and the landside of the plow shares are caused to remain in alignment with the vertical wall formed at the landside of the soil by the plow shares during the formation of furrows and plowing operations for preventing the formation of shoulders.

A still further object of the invention is to provide means for automatically cleaning mould boards of adhering soil during backing movements.

A primary object of the invention is to provide an improved and more practicable construction than that construction described and illustrated in my patent of the United States No. 1,998,032.

Other and further objects and advantages of the invention will be obvious from the following detailed description thereof, reference being had to the accompanying drawings in which:

Figure 2 is an enlarged top plan view thereof, certain relative positions of the parts thereof showing in dotted lines.

Figure 3 is a transverse section of a portion of the hitch, the view being taken substantially on line 3—3 of Figure 2.

Figure 4 is a view similar to Figure 3 taken on line 4—4 of Figure 2.

Figure 1:
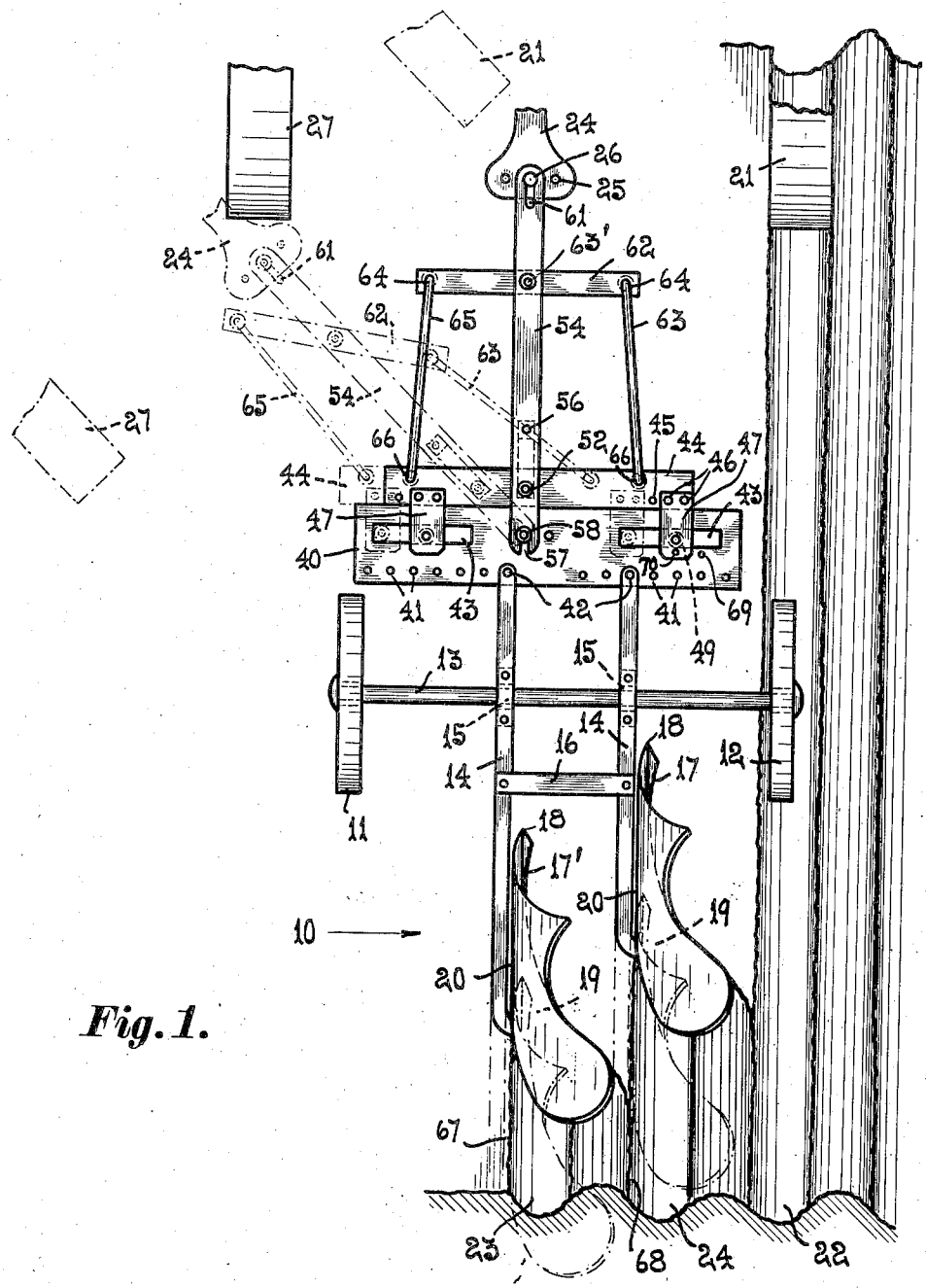
Figure 1 is a top plan view of the new hitch.

Referring now to the drawings for a more particular description 10 indicates generally a plow provided with spaced apart wheels 11 and 12 mounted on a non-rotatable axle 13 for supporting one or more beams 14 above the soil, portions of said beams extending forwardly and rearwardly of the axle 13. The beams are attached to the axle by the pillow blocks 15, whereby the beams may be spaced apart selected distances along the axle 13 and clamped to the latter for correspondingly forming furrows of selected spaced apart distances as later described. A brace bar 16 extends between the beams 14 and at the rear downwardly turned ends of the beams plow shares 17 and 17' are respectively secured thereto by any suitable means.

In the present illustration two plow shares are depicted, one thereof being disposed rearwardly of the other, each having a plowing point 18, a mould board 19 and a straight vertically disposed land side portion 20.

As practiced in the art the mould board of the plow is of arcuate shape in cross section being adapted to turn the soil in a well known manner during formation of furrows, it being of advantage that the furrows are disposed in exact parallelism with respect to each other and as an aid for the accomplishment of this objective the wheel 12 of the plow together with the wheel 21 of the towing tractor traverses the field in the furrow 22 formed by the plow share 17' during a prior travel of the plow and tractor around or across the field. Thus, as illustrated, the plow share 17' is forming a furrow 23 which will be occupied by the wheels 12 and 21 during a subsequent travel of the plow across the field. The plow share 17 turns a furrow 24 which is not occupied at any time by the wheels 12 and 21 and it will be understood that often it is of advantage in accordance with said conditions to employ a gang of plow shares comprised of several of the latter for economy of operation.

As heretofore practiced the more plow shares that are included in a gang plow the greater the possibility of the wheel 21 of the tractor leaving the furrow 22 particularly at times when the surface of the soil is not level and furrows being formed in misalignment and out of parallelism with respect to each other, and the present invention contemplates obviating the undesirable practices of the prior art.

At 24 is indicated a coupling step of a tractor, the latter being provided with an internal combustion engine, not shown, in a well known manner. The coupling step is provided with a plurality of spaced apart apertures 25 for coupling any implement or tool to the tractor by means of passing a bolt or the like such as the pivot pin 26 through a selected aperture 25. At 27 is indicated the other rear wheel of the tractor and between the latter and the beams 14 the new towing hitch guide is disposed.

The new device includes an elongated coupling-plate 40 of sturdy steel construction which is disposed, in use, transversely of the furrows 23 and 24 and in parallelism with the axle 13. The edge or rear edge of the plate 40 which, in use, is disposed towards the axle 13 is provided with a row of equidistantly spaced apart apertures 41 for the reception therethrough of connecting bolts 42. The bolts 42 also extend through suitable apertures provided on the forward ends of the beams 14 and it will be understood that the bolts 42 are disposed through certain of the apertures 41 as may be selected for corresponding to the distance between furrows desired and for purposes later described.

Elongated rectangular slots 43 are disposed through and extend longitudinally of the plate 40 adjacent each end thereof. Forwardly of the coupling-plate 40 a shiftable draw-plate 44 is disposed in horizontal alignment and longitudinal parallelism therewith.

As best shown in Figure 2, the draw-plate 44 is elongated and adjacent the ends thereof equidistantly spaced apart apertures 45 are provided for the reception of bolts or similar keepers 46 for securing pairs of tangs 47 to the draw-plate 44 by means of the bolts 46 in a manner whereby the pairs may be selectively disposed toward or away from the outer ends of the draw-plate 44 for purposes later described.

The tangs 47 of each pair, as shown in Figure 4, are respectively disposed upon the top and against the bottom of the draw-plate 44. Between oppositely disposed tangs 47 of each pair pivot bolts 48 extend through respective slots 43 of the coupling-plate 40. An anti-friction roller 49 of case hardened steel encircles each pivot bolt 48. A roller 49 is disposed in each slot 43 of the coupling-plate 40, being of a diameter substantially equivalent to the transverse width of said slots. As thus described it will be understood that at times when towing stresses are applied to the draw-plate 44 by the tractor through a later described mechanism, that said stress is transferred to the coupling-plate 40 and to the beams 14 while at the same time the draw-plate 44 is longitudinally movable with respect to and in parallelism with the coupling-plate 40 for purposes later described.

Approximately mid-way between the ends of the draw-plate 44 an aperture 50 is provided for the reception of a bearing sleeve 51 and a pivot bolt 52 which extends through the sleeve 51. An aperture 53 is provided through a draw-tongue 54 which, as best shown in Figure 3, also receives the sleeve 51 and bolt 52. Also the bolt 52 extends through a reinforcing strut 55, the forward end of which is up-turned and secured to the draw-tongue by any suitable means such as the bolt 56, whereby the draw-plate 44 is pivotally attached to the draw-tongue 54.

The rear end of the draw-tongue 54 is bifurcated, the side walls 57 of the said bifurcation receiving therebetween a bolt 58 and an anti-friction sleeve bearing 59. Said bolt and sleeve also extending through one of the selective apertures 60 of the coupling-plate 40, as shown in Figure 2.

At the forward end of the draw-tongue 54 an elongated aperture 61 is provided for receiving the heretofore mentioned pivot pin 26 for connecting the draw-tongue 54 to the coupling step 24 of the tractor and between the slot 61 and the draw-plate 44 a cross bar 62 is pivotally and swingably attached to the draw-tongue by means of a pivot bolt 63'. At opposite outer ends of the cross bar 62 connecting links 63 and 65 are respectively pivotally attached as at 64. The rear ends of the connecting links 63 and 65 are also pivotally connected as at 66 to respective ends of the draw-plate 44.

The normal position of the anti-friction rollers 49 in their respective slots 43 of the coupling plate 40 is midway between the ends of said slots, said rollers together with the pairs of tangs 47 and the draw-plate 44 being moveable in either direction towards either end of the coupling-plate 40.

As thus described it will be noted that the coupling plate 40 is stationary with respect to the plow and the beams 14 thereof and that at times when the tractor and the coupling step 24 thereof is turned to the left, as shown by the dotted lines in Figure 1, a corresponding movement to the left of the forward apertured end of the draw-tongue 54 is caused. The side walls 57 of said bifurcated notch sliding on the fulcrum roller sleeve 59 whereby a corresponding movement of the draw-plate 44 is imparted to the left together with a like movement of the pairs of tangs 47 and their anti-friction rollers. During said movement to the left the rollers 49 apply a towing stress to the coupling-plate 40 and to the plow beams secured thereto, the stress being applied evenly to the opposite ends of the draw-plate 44 and to the coupling plate 40 through the connecting links 63 and 65, said links receiving an equalized amount or half portion of said stress from the equalizing cross bar 62 and the latter receiving the towing stress applied by the tractor to the draw-tongue 54 midway between the ends of the bar 62 whereby the plow is caused to move forwardly in a straight line an appreciable distance after the wheel 21 of the tractor has been turned from the furrow 22 and is then traveling in a direction oblique with respect to the forward line of travel of the plow, whereby the plow shares 17 and 17' become further projected towards the corners of the field and furrows are formed which are approximately rectangular in plan at said corners.

Similarly at times when the tractor is caused to move backwards by its engine and in all instances when the tractor is not in longitudinal parallelism with the beams 14, the plow hitch guides the beams and the plow shares attached thereto rearwardly in alignment with their respective furrows 23 and 24, since the stress is applied evenly to the beams by the above described movable hitch parts moving compensatingly and correspondingly for causing the same.

As thus described it will be understood that the portion of the plow shares which are buried in the soil at the ends of their respective furrows are caused to move straight backwards during backing operations as well as straight forward during towing operations, whereby the landside of the plow shares remain against the vertical walls 67 of the furrow 23 and the vertical wall 68 of the furrow 24 respectively during plowing operations and the mould boards are prevented from having transverse turning movements of their respective furrows whereby the formation of shoulders of soil are prevented and furrows are formed which are in true parallelism and equi-distantly spaced apart with respect to each other without the employment of springs as heretofore, said alignment of the plow shares being maintained evenly at times when hard clay portions of a field are encountered.

At times when a tractor is drawing a plow, such as described, to and from the field it is desirable to lock the hitch so that the parts thereof are immovable with respect to each other and for this purpose an aperture 69 is provided through the coupling plate 40, as best shown in Figures 1 and 2, and similar apertures 70 provided through one of the pairs of tangs 47, said apertures being so arranged that they are adapted to align for the reception of a bolt 71, the latter being illustrated in dotted lines in Figure 4 and it will be understood that at times when the bolts 70 are placed through the apertures that the several parts of the hitch are immovable with respect to each other and at this time the plow is towed by the tractor and has pivotal movements with respect to the tractor only at the pivot pin 26.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is therefore to be understood that my invention is not to be limited to the specific details shown and described.

I claim:

1. A towing hitch comprising a plate adapted to be rigidly coupled to a plow, a draw-tongue having an end provided with a fulcrum connection with said plate between the ends of the latter, a draw-plate having a pivotal connection between its ends with said tongue, said coupling plate having an elongated aperture at each of its ends, a roller in each said aperture, a tang extending from each roller to said draw-plate for securing the rollers to the draw-plate and providing a shiftable connection between the draw-plate and said coupling plate for permitting longitudinal sliding movements of said plates with respect to each other, links oppositely disposed at each side of said tongue having ends pivotally connected with respective ends of said draw plate, and a cross-bar pivotally connected to said tongue between one end of the latter and the pivotal connection between said tongue and draw-plate, the other ends of said links being pivotally connected to respective ends of said cross-bar.

2. A towing hitch for a gang plow supported by wheels comprising a coupling plate adapted to be locked to the plow, a draw-tongue having an end provided with a fulcrum connection with said coupling plate between the ends of the latter, the other end of said tongue adapted to be pivotally connected to a tractor, a draw plate having a shiftable connection to said coupling plate at each of its ends and a pivotal connection with said tongue between its ends, a cross-bar pivotally secured to the tongue adjacent to the tractor connection end thereof, and links oppositely disposed at each side of said tongue, said links each having an end pivotally connected to a respective end of said cross-bar, the other ends of said links being pivotally secured to said draw-plate.

HENRY TONJES, JR.